Jan. 12, 1960 J. FRADENBURGH 2,920,743
SLAT CONVEYOR FOR PILL-COUNTING APPARATUS
Filed Oct. 28, 1954
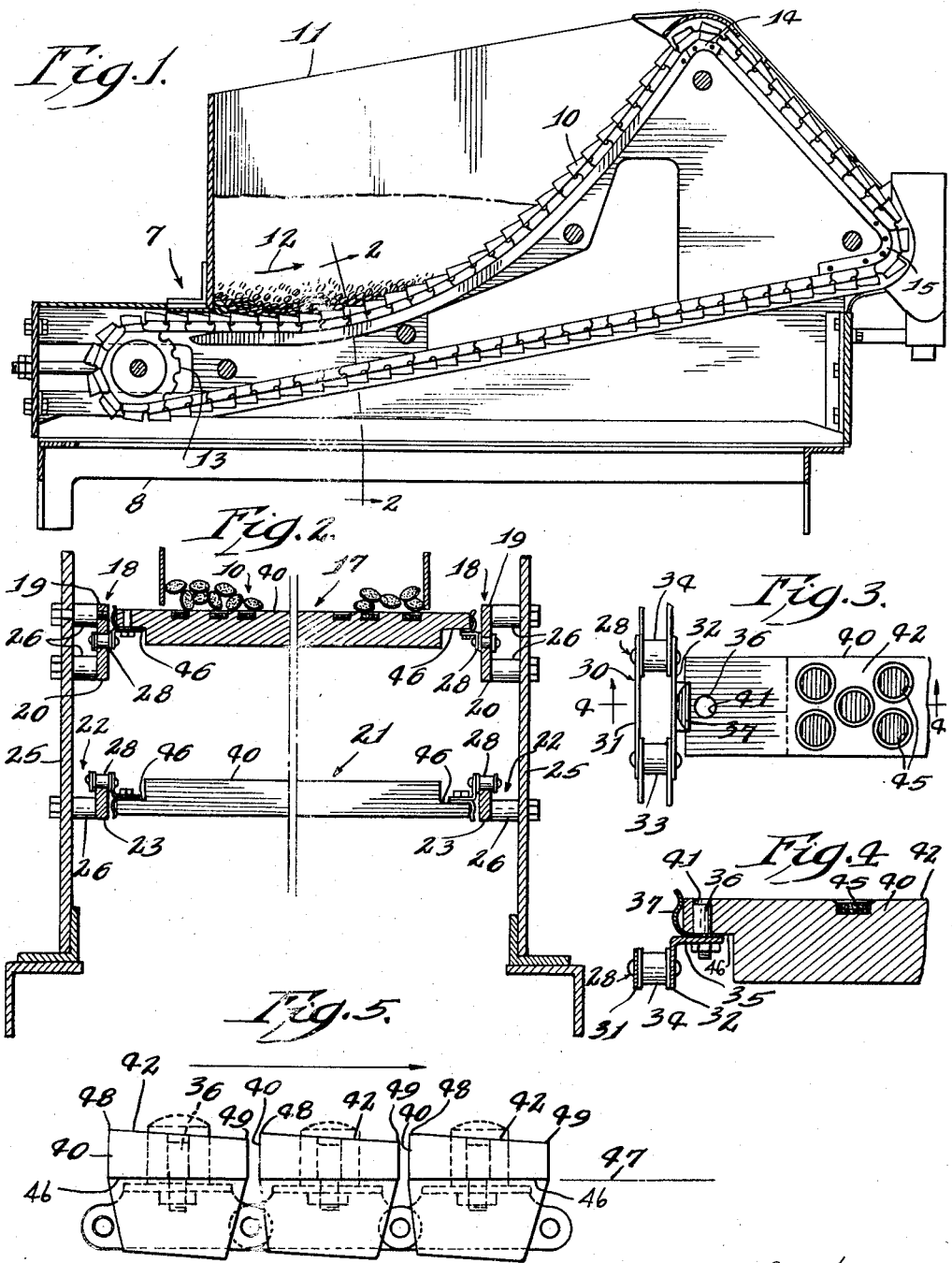
Inventor.
John Fradenburgh.

United States Patent Office 2,920,743
Patented Jan. 12, 1960

2,920,743

SLAT CONVEYOR FOR PILL-COUNTING APPARATUS

John Fradenburgh, Dunedin, Fla., assignor to United States Automatic Box Machinery Company, Inc., Boston, Mass., a corporation of Massachusetts Application October 28, 1954, Serial No. 465,260

7 Claims. (Cl. 198—54)

This invention relates to an endless conveyor of the slat type, and more particularly to a slat conveyor used in pill-counting apparatus.

U.S. Patent No. 2,661,133, dated December 1, 1953, illustrates pill-counting apparatus of the type for which subject conveyor is intended.

One object of the invention is to provide a slat conveyor for use in pill-counting apparatus which has improved counting and conveying characteristics. As more fully described in the aforesaid patent, the respective slats of the conveyor have a predetermined number of pill-receiving recesses in the upper or conveying surfaces thereof. The conveyor comprises the bottom of a pill hopper, and as the slats travel beneath the pills in the hopper, pills are deposited in the several recesses, one pill per recess. Thereafter the slats travel to a pill-depositing station where they are inverted and jarred to discharge the pills.

The pills near the bottom of the hopper, due to their shape and the weight of the pills above, often tend to form an interlocking pattern which sometimes prevents pills from being deposited in the recesses. The present slats, as will be seen, impart gentle movement to the pills in the vicinity of the slats and thus oppose any tendency of the pills to form an interlocking pattern.

In accordance with the invention, the conveying surface of each slat is inclined upwardly and rearwardly with respect to the plane and direction of slat travel. With this arrangement, the rear or trailing edge of the conveying surface of a slat is spaced significantly above the front or leading edge of the conveying surface of the next following slat. As the slats pass beneath a mass of pills in the direction of conveyor travel, a gentle up and down movement is imparted to the pill mass as the individual pills drop through the distance from the trailing edge of one slat to the leading edge of the next following slat. This up and down movement prevents the formation of an interlocking pill pattern and animates the pills sufficiently so it is virtually a certainty that each recess will receive a pill. This, of course, improves the accuracy of the count to a degree where 100% accuracy can be expected.

This inclined conveying surface arrangement also provides a slat conveyor wherein there are no discontinuities which engage the pills (except the recesses) and carry them to a brush or similar device heretofore provided to return excess pills to the hopper.

Conveyor slats usually are made of non-metallic material, and in the manufacture thereof it is almost impossible to maintain dimensional accuracy. Further, a non-metallic slat has a natural tendency to warp during use. Consequently when such slats are assembled into a conveyor such as shown in Patent No. 2,661,133, instead of a continuously smooth surface it is found that one slat is slightly high, another is slightly low, etc., throughout the conveyor.

This condition is a source of trouble when handling certain types of soft pills such as aspirin tablets. An upwardly protruding leading edge of a slat carries pills up the inclined conveyor and the corners of the pills are shaved or chipped off as the pills are engaged by a brush or other return device.

This difficulty has been overcome with the present invention wherein the leading edge of one slat always is below the trailing edge of the slat ahead. With this arrangement there are no discontinuities in the conveyor to engage the pills other than the desired recesses.

Another object of the invention is to provide a slat conveyor for pill-counting apparatus wherein the use of individual "breaker" slats is rendered unnecessary. Thus the invention eliminates the need for using slats of a special type which heretofore has been found necessary.

Other objects, advantages and details of the invention will be apparent as the description proceeds, reference being had to the accompanying drawing wherein one form of the invention is shown. It is to be understood, however, that the description and drawing are illustrative only, and that the scope of the invention is to be measured by the appended claims.

In the drawing:

Fig. 1 is a longitudinal, sectional view of pill-counting apparatus embodying the invention;

Fig. 2 is an enlarged sectional view on line 2—2 of Fig. 1;

Fig. 3 is a plan view of one end of a conveyor slat illustrating an arrangement for mounting the slat end on a slat carrier means;

Fig. 4 is a sectional view on line 4—4 of Fig. 3, and

Fig. 5 is an end elevational view of three adjacent slats forming part of the conveyor.

Referring to the drawing, pill-counting apparatus of the Patent No. 2,661,133 type is generally designated 7 in Fig. 1. The apparatus includes a supporting framework 8, an endless conveyor 10 of the slat type and a pill hopper 11. Conveyor 10 forms the bottom of hopper 11 and it travels along the bottom of hopper 11 in the direction of arrow 12, first along a generally horizontal path and then along an upwardly inclined arcuate path.

Conveyor 10 is driven by sprocket 13, there being a sprocket 13 on each side of the apparatus, and it is guided by means of guide tracks around corners designated 14 and 15.

As better shown in Fig. 2, upper course 17 of conveyor 10 has spaced guide tracks 18, one on each side of the apparatus. A guide track 18 includes an upper guide rail 19 and a lower guide rail 20, opposing guide rail surfaces being separated from each other by a short distance.

Lower conveyor course 21 also has spaced guide tracks 22, one on each side of the apparatus. Each guide track 22 comprises a single guide rail 23.

The respective guide rails 19, 20 and 23 are carried by side members 25 of the apparatus, the rails being spaced from the members 25 by means of spacers 26.

Conveyor 10 includes a pair of spaced endless chains 28, one chain being located on each side of the apparatus and engaging the guide tracks, as best shown in Fig. 2.

Referring to Figs. 3 and 4, a chain 28 comprises a plurality of links 30, each link including an outer link element 31 and an inner link element 32. Link elements 31 and 32 are pivoted at their ends to rollers 33 and 34.

Inner link element 32 has an inwardly extending shelf portion 35 (Fig. 4) which carries an upwardly extending stud 36. A spring clip 37 is secured to shelf portion 35 by means of stud 36.

The effective part of conveyor 10 comprises a plurality of closely spaced slats 40 which extend transversely between the spaced chains 28. Each slat end contains an aperture 41 which receives a stud 36, the slat end being supported by shelf portion 35 of an inner link element 32. As shown in Figs. 3 and 4, spring clip 37 is effective to retain a slat 40 in position in the conveyor. Clips 37, however, are yieldable so that a slat is readily removable merely by lifting it off its associated studs 36.

The respective conveyor chains 28 are guided throughout the conveyor path by the aforesaid guide rails 19, 20 and 23, the conveyor slats moving with the chains. The chains 28 and the component parts thereof such as outer and inner link elements 31 and 32, rollers 33—34, shelf portions 35, studs 36 and retaining clips 37 are hereinafter sometimes referred to as "slat carrier means."

Slats 40 each have an upper or conveying surface 42 (Figs. 3 and 4) which is provided with a plurality of pill-receiving recesses 45. Each recess 45 is intended to receive a pill as the slats travel along the hopper bottom.

Conveying surface 42 of each slat is generally planar and is inclined upwardly and rearwardly with respect to the plane and direction of slat travel. This upward and rearward inclination is best shown in Fig. 5, the angle of inclination being of the order of 3°.

In the form of slats here shown, the slat ends are undercut to provide a shoulder 46 which engages the slat carrier means. The desired inclination of the conveying surface of the slats is achieved by beveling the respective shoulders 46 with respect to the conveying surfaces.

Still referring to Fig. 5, a plane of slat travel passing through slats 40 below conveying surfaces 42 is designated 47. It will be noted that the rear or trailing edge 48 of conveying surface 42 is spaced a greater distance from plane 47 than is the front or leading edge 49 of conveying surface 42.

Describing this arrangement in another manner, rear edges 48 of conveying surfaces 42 are uniformly spaced above a plane of slat travel which passes through front edges 49 of the conveying surfaces 42.

Thus, rear edge 48 of conveying surface 42 of one slat is spaced somewhat above front edge 49 of conveying surface 42 of the next following slat. This irregularity between conveying surfaces 42 of adjacent slats causes the pills above the first slat to drop gently onto the following slat as the slats move below the pill mass. Thereafter, this column of pills rises slowly as it rides up the conveying surface of the following slat, the speed of pill movement in the direction of slat movement being somewhat slower than that of the slats. This gentle up and down movement of the pills above the slats prevents the formation of an interlocking pill pattern and thereby virtually insures that each pill-receiving recess 45 will receive a pill. When all recesses are filled, the counting accuracy of the apparatus is 100%.

With the trailing edges of the conveying surfaces of all slats spaced above the leading edges of the next following slats, there are no discontinuities in the conveyor surface (other than the recesses) to carry pills to a point beyond the normal angle of repose of the pills on the conveyor. This predetermined spacing of adjacent slat edges more than offsets dimensional irregularities of the slats introduced during manufacture and by warpage as well as by variations in mounting the slats. As previously mentioned, the absence of objectional discontinuities in the conveyor surface avoids shaving and chipping damage to the pills.

From the above description it is thought that the construction and advantages of the invention will be readily apparent to those skilled in the art. Various changes in detail may be made without daparting from the spirit or losing the advantages of the invention.

Having thus described the invention, what I claim as new and desire to secure by Letters Patent is:

1. In combination, a hopper and a slat conveyor forming the bottom thereof, said slat conveyor comprising a pair of laterally spaced guide tracks, slat carrier means cooperating with each guide track and a plurality of closely spaced slats extending transversely between and connected to said slat carrier means, said slats each having a conveying surface which is inclined upwardly and rearwardly with respect to the plane and direction of slat travel, said conveying surface having object-receiving recesses therein, whereby conveyor travel imparts a gentle up and down movement to pill type objects contained in said hopper.

2. The combination of claim 1 wherein the angle of inclination is of the order of 3°.

3. In combination, a hopper and a slat conveyor forming the bottom thereof, said conveyor including a plurality of closely spaced slats extending transversely of the direction of conveyor travel, said slats each having a conveying surface which is inclined upwardly and rearwardly with respect to the plane and direction of slat travel, said conveying surface having object-receiving recesses therein, whereby conveyor travel imparts a gentle up and down movement to pill type objects contained in said hopper.

4. Pill-counting apparatus including a hopper and a slat conveyor forming the bottom thereof, said slat conveyor comprising a plurality of closely spaced slats extending transversely of the direction of conveyor travel, said slats each having a conveying surface containing pill-receiving recesses therein, the said conveying surfaces each being inclined upwardly and rearwardly with respect to the plane and direction of slat travel, whereby conveyor travel imparts a gentle up and down movement to pills contained in said hopper.

5. In combination, a hopper and a slat conveyor forming the bottom thereof, said conveyor including a plurality of closely spaced slats extending transversely of the direction of conveyor travel, the conveying surface of each slat being generally planar, the rear edge of the conveying surface of each slat being spaced a greater distance than the front edge of the conveying surface of the next following slat from a plane of slat travel passing through the slats below the front edges, said conveying surface having object-receiving recesses therein, whereby conveyor travel imparts a gentle up and down movement to pill type objects contained in said hopper.

6. In combination, a hopper and a slat conveyor forming the bottom thereof, said conveyor including a plurality of closely spaced slats extending transversely of the direction of conveyor travel, the conveying surface of each slat being generally planar and having object-receiving recesses therein, the rear edges of the conveying surfaces of the slats being uniformly spaced above a plane of slat travel passing through the front edges of the conveying surfaces, whereby conveyor travel imparts a gentle up and down movement to pill type objects contained in said hopper.

7. In combination, a hopper and a slat conveyor forming the bottom thereof, said conveyor including a plurality of closely spaced slats extending transversely of the direction of conveyor travel, the conveying surface of each slat having object-receiving recesses therein and being generally planar and inclined upwardly and rearwardly, the rear edge of one conveying surface lying in a travel plane spaced above the front edge of the conveying surface of the next following slat, whereby conveyor travel imparts a gentle up and down movement to pill type objects contained in said hopper.

References Cited in the file of this patent

UNITED STATES PATENTS

| | | |
|---|---|---|
| 770,694 | Parrot | Sept. 20, 1904 |
| 880,091 | Paton | Feb. 25, 1908 |
| 1,203,760 | Malm | Nov. 7, 1916 |
| 1,224,188 | Molm | May 1, 1917 |
| 1,432,076 | Mellin | Oct. 17, 1922 |
| 2,308,190 | Magnuson | June 12, 1943 |

FOREIGN PATENTS

| | | |
|---|---|---|
| 240,185 | Germany | Oct. 31, 1911 |
| 531,467 | Germany | Aug. 10, 1931 |